J. E. WILLIAMS.
COSMOSCOPE.
APPLICATION FILED APR. 3, 1909.
957,529.
Patented May 10, 1910.
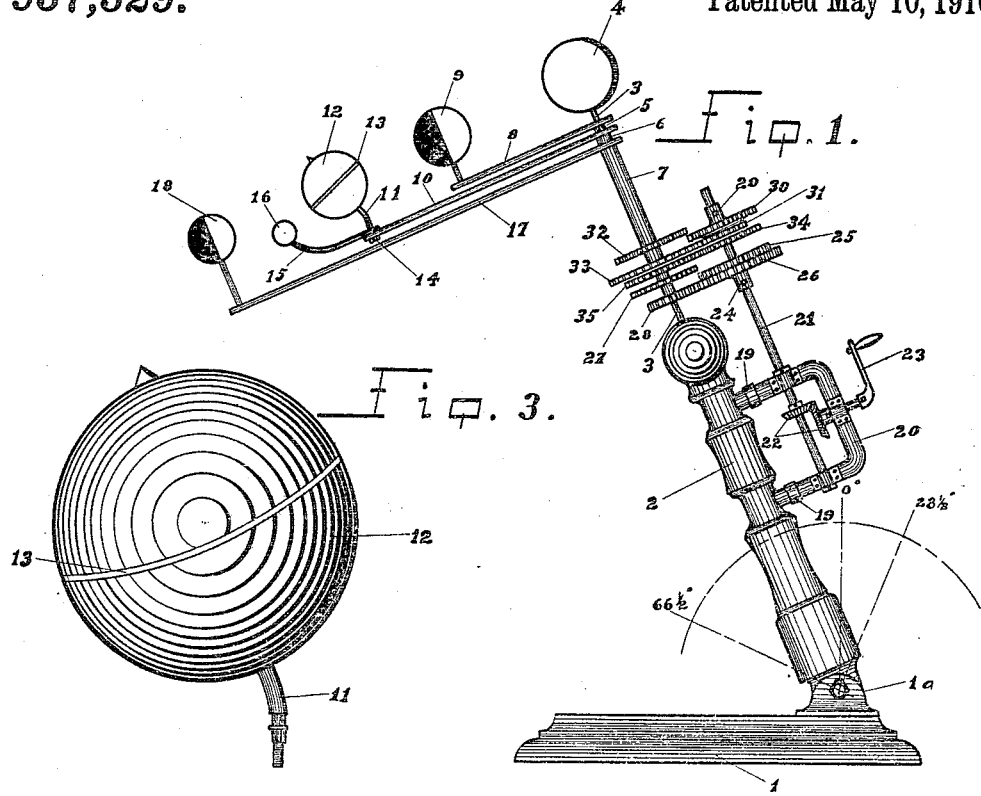
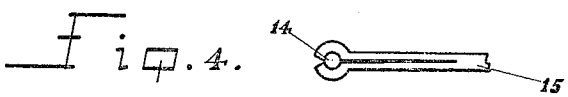
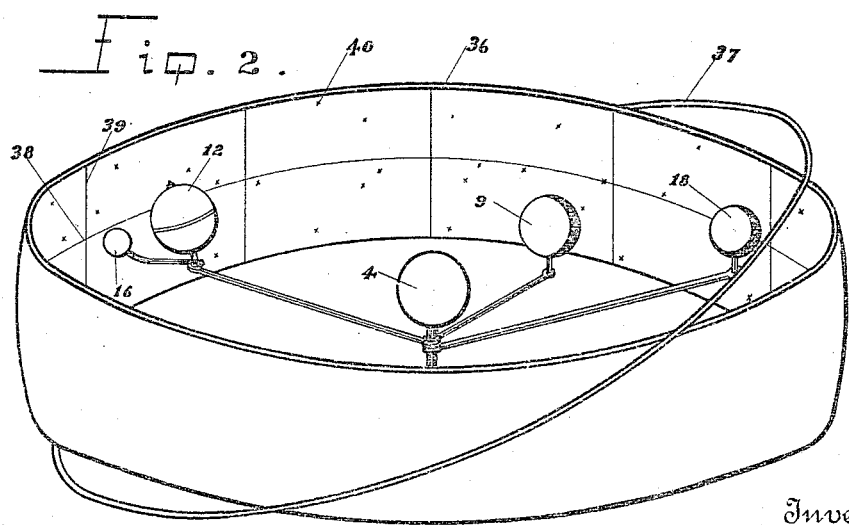
Witnesses
Wm B. Griffin
Inventor
John E. Williams.
Attorney

UNITED STATES PATENT OFFICE.

JOHN E. WILLIAMS, OF CERES, CALIFORNIA.

COSMOSCOPE.

957,529.  Specification of Letters Patent.  Patented May 10, 1910.

Application filed April 3, 1909. Serial No. 487,799.

*To all whom it may concern:*

Be it known that I, JOHN E. WILLIAMS, a citizen of the United States, residing at Ceres, in the county of Stanislaus and State of California, have invented certain new and useful Improvements in Cosmoscopes; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in cosmoscopes, that is to an apparatus for teaching by mechanical demonstration all lessons pertaining to the solar system and for demonstrating the relative movements of the bodies in the solar system with respect to each other and with respect to the remaining bodies in the universe.

The main object of the invention is to provide a mechanical means for the purposes above set forth which will be simple, durable, convenient and easily packed for transportation and yet one which will be highly efficient for easily and readily and clearly performing the educational functions required of such a mechanism. These objects I accomplish by means of a base maintaining a hinged support movable in one plane through 90°, viz. 66½° on one side of a perpendicular and 23½° on the other side of such perpendicular. Fixed on said such support is a ball to represent the sun, and movable around this ball, are other balls to represent the other main bodies of the solar system, there being a gear mechanism to operate such balls to show their relative movements with respect to the sun. To show the movements of the solar system relative to the other bodies in the universe, a circular band 16° wide is placed around the above mentioned balls on the interior of which band may be represented a section of the celestial sphere including markings to represent the ecliptic and the different signs of the zodiac and markings may be placed thereon to represent the different stars of the constellations of the zodiac, all for the purpose of showing the relative movement of the bodies of the solar system to the remaining bodies of the universe. I also employ such other and further structure and relative arrangement of parts as will more fully appear by a perusal of the following specification and claims.

In the drawings similar characters of reference indicate corresponding parts in the several views.

Figure 1 is a side elevation of the complete apparatus for representing the solar system. Fig. 2 is a perspective view of the mechanism used for illustrating the relation of the solar system to the universe. Fig. 3 is an enlarged view of the ball used to represent the earth. Fig. 4 is a fragmentary view showing a spring clip or engaging member.

Referring now more particularly to the characters of reference on the drawings 1 designates a base hinged to which as at 1ª is a support 2 adapted to move in one plane through 90°, that is 66½° on one side of the perpendicular to the base and 23½° on the other side of such perpendicular for the purpose of illustrating the positions of the celestial equator, ecliptic, zodiac, and pole stars with reference to the horizon at the several different latitudes on the earth.

Removably inserted into the support 2 is a rod 3 on the upper end of which is fixed a ball 4 representing the sun. Rotatably mounted on the rod 3 is a sleeve 5 rotatably mounted on which is a sleeve 6 and on said sleeve 6 is rotatably mounted still another sleeve 7. On the upper end of the sleeve 5 is a projecting arm 8 on the outer end of which is a ball 9 to represent Venus (and in certain instances, Mercury, as will appear hereafter). On an arm 10 on the upper end of the sleeve 6 is turnably mounted a rod 11 bending at an angle of 23½° to the arm 10 on which rod is rotatably mounted the ball 12 representing the earth, 13 on said ball representing the equator. Fixedly secured on the rod 11 by a spring clip member 14 is an arm 15, carrying a ball 16 to represent the moon. On the top of the sleeve 7 is an arm 17 maintaining on its outer end a ball 18 to represent Mars (or Jupiter in certain instances as will hereafter appear). All the balls described are spaced apart the same relative distance as the bodies which they represent.

Removably secured to the support 2 by means of screw collars 19 is a frame 20 carrying a shaft or rod 21 adapted to be rotated by means of a handle 23 engaging said rod or shaft 21 by means of a gear 22. On the rod 21 is a sleeve 24 carrying gears 25 and 26 adapted to be alternately engaged with gears 27 or 28 respectively on the sleeve 5 for the purpose as will appear. This adjustment is occasioned by such sleeve 24 being slidable on the rod 21 and having a set screw 24ª to fix it in any desired position. Similarly on a sleeve 29 having a set screw 29ª on the shaft 21 are gears 30 and 31 adapted to be alternately engaged with gears 32 and 33 respectively on the sleeve 7. Fixed on the shaft 21 is a gear 34 engaging a gear 35 on the sleeve 6.

To show the relative movements of the bodies of the solar system the handle 23 is operated, which through the gear mechanism described, rotates the several balls representing their respective bodies of the solar system at such speed as they relatively move with respect to each other. To use the balls 9 and 18 as Mercury and Jupiter instead of Venus and Mars, as described, I provide the changeable gear mechanism described whereby said balls 9, 12 and 18 can be revolved around the ball 4 to show the relative times of revolution of Venus, the earth and Mars with one set of said gears engaged and by adjustment to the alternate set these same balls 9 and 18 can be rotated at such speed as to show the relative time of revolution of Mercury, the earth and Jupiter, and thus the ball 9 is given two different rates of speed relative to the ball 12 to represent the time of revolution of Venus or Mercury, and 18 is likewise given two rates of speed relative to the ball 12 to show the time of revolution of Mars or Jupiter and thus each of the balls 9 and 18 perform a double function thus saving a multiplicity of parts. The ball 16, representing the moon, can be changed to different positions by hand by reason of the spring clip member 14. The rod 11 being bent at an angle $23\frac{1}{2}°$ and being freely turnable, the gravity of the weight of the ball 12 causes said rod 11 as the axis of said ball 12 representing the earth to maintain a position at any place in its orbit parallel to its position in any other place, i. e. cause it to point in the same direction at all times as does the earth's axis in its revolution around the sun, represented by the ball 4. This feature is of use in explaining change of seasons, difference in length of day and night, etc.

When it is desired to show the relative positions and movements of the bodies of the solar system to the remaining bodies of the universe, a circular band 36 is placed around the ball mechanism above described, to represent a section about 16° wide of the celestial sphere called the zodiac. Attached to and crossing the said band 36 at an angle of $23\frac{1}{2}°$ is a wire member 37 representing the celestial equator. The band 36 serves as a support for maps or charts upon which may be drawn a line 38 to represent the ecliptic, and crossing which may be lines 39 to divide the map or chart into twelve parts representing the constellations of the zodiac. Also the line 38 may be divided into twelve equal parts to represent the signs of the zodiac. In each of said parts may be representations 40 to show the stars of the constellations of the zodiac. Also may be shown equinoxes and all other necessary data. The revolving of the balls within this band then shows the apparent relative positions and movements of the sun, moon and planets through the heavens among the stars. The band 36 containing map may be moved around on its support to show the apparent westward rotations of the heavens due to the earth's rotation on its axis and thus to show, by projections of the band into the heavens, the direction and position of the heavenly bodies at any time of the day.

The screw collars 19 permit the main apparatus to be taken apart for packing compactly for protection and transportation.

From the foregoing description it will be readily seen that I have produced a means for teaching the movements of the bodies of the universe by mechanical illustration set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A cosmoscope comprising a pivoted standard carrying a plurality of revolving balls, projecting arms on said standard, a U-shaped frame, screw collars on said frame screw mounted on said arms, and a gear mechanism carried by said frame driving said balls.

2. A cosmoscope comprising a standard, a rod projecting upwardly therefrom, a fixed ball on said rod, three sleeves disposed one within the other on said rod, a projecting arm on each sleeve, such arms being of different lengths, a ball rigidly attached to each of the upper and lower arms, a curved bar on the middle arm, and a ball turnable on said curved bar.

3. A cosmoscope comprising a standard, a rod projecting upwardly therefrom, a fixed ball disposed on said rod, three sleeves disposed one within the other on said rod, a projecting arm on each sleeve, such arms being of different lengths, a ball rigidly attached to each of the upper and lower arms, a curved bar on the middle arm, a projecting arm having a spring clip member engaging said bar, a ball on said arm, and a ball turnable on said curved bar.

4. A cosmoscope comprising a standard, a rod projecting upwardly from said standard, a plurality of sleeves on said rod, each sleeve being provided with two gears one of greater dimensions than the other, a driving shaft, gears on said shaft adapted to be alternately engaged with one or the other of said gears on said sleeves, an arm on each sleeve and a ball on each arm.

In testimony whereof I affix my signature in presence of two witnesses.

JOHN E. WILLIAMS.

Witnesses:
   J. W. WEBB,
   R. S. MARSHALL.